(12) United States Patent
Byun et al.

(10) Patent No.: US 7,903,089 B2
(45) Date of Patent: *Mar. 8, 2011

(54) METHOD FOR SEARCHING MENU IN MOBILE COMMUNICATION TERMINAL

(75) Inventors: Yu Chan Byun, Kyongld-Do (KR); Chan Yong Park, Seoul (KR); Jun Hyoung Koo, Seoul (KR); Jin Soo Lee, Kyungld-Do (KR); Yu Sung Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

This patent is subject to a terminal disclaimer.

(21) Appl. No.: 09/789,749

(22) Filed: Feb. 22, 2001

(65) Prior Publication Data

US 2001/0015721 A1    Aug. 23, 2001

(30) Foreign Application Priority Data

Feb. 22, 2000 (KR) .................................. 2000-8609

(51) Int. Cl.
*G06F 3/02* (2006.01)
*G06F 3/00* (2006.01)
*G09G 5/00* (2006.01)
*H04M 1/00* (2006.01)

(52) U.S. Cl. ........................ 345/169; 455/566; 715/700

(58) Field of Classification Search ................. 455/566, 455/414.4, 550.1, 558; 379/142; 340/425.5; 345/156, 169; 715/700, 713, 717, 764, 781, 715/784, 786

See application file for complete search history.

(56) References Cited

U.S. PATENT DOCUMENTS

| | | | | |
|---|---|---|---|---|
| 5,721,847 | A | | 2/1998 | Johnson .......................... 715/786 |
| 5,761,610 | A | * | 6/1998 | Sorensen et al. .............. 455/558 |
| 5,841,849 | A | * | 11/1998 | Macor ........................... 379/142 |
| 6,011,546 | A | * | 1/2000 | Bertram ........................ 715/700 |
| 6,011,549 | A | | 1/2000 | Shoji et al. .................... 345/684 |
| 6,029,065 | A | * | 2/2000 | Shah ........................... 455/414.4 |
| 6,125,287 | A | * | 9/2000 | Cushman et al. ............. 455/566 |
| 6,208,879 | B1 | * | 3/2001 | Iwata et al. ................... 455/566 |
| 6,415,164 | B1 | * | 7/2002 | Blanchard et al. ............ 455/566 |
| 6,429,773 | B1 | * | 8/2002 | Schuyler ..................... 340/425.5 |
| 6,456,841 | B1 | * | 9/2002 | Tomimori ................... 455/412.2 |
| 6,549,789 | B1 | * | 4/2003 | Kfoury ....................... 455/550.1 |

FOREIGN PATENT DOCUMENTS

| | | |
|---|---|---|
| CN | 97114761.2 | 7/1997 |
| CN | 99105581.0 | 3/1999 |
| JP | 09-198221 | 7/1997 |
| JP | 10-214172 | 8/1998 |
| JP | 11-184598 | 7/1999 |

OTHER PUBLICATIONS

Office Action dated Dec. 29, 2009 for U.S. Appl. No. 11/646,265.
Office Action dated Dec. 20, 2009 for U.S. Appl. No. 11/646,529.
Office Action dated Nov. 30, 2009 for U.S. Appl. No. 11/646,548.

* cited by examiner

Primary Examiner — Srilakshmi K Kumar
(74) Attorney, Agent, or Firm — KED & Associates, LLP

(57) ABSTRACT

The present invention relates to a method for searching a menu in a mobile communication terminal, wherein a plurality of main menus and sub menus of each main menu are simultaneously searched on a single menu screen using various navigational keys.

83 Claims, 5 Drawing Sheets

METHOD FOR SEARCHING MENU IN MOBILE COMMUNICATION TERMINAL

BACKGROUND OF THE INVENTION

1. Field of the Invention

The present invention relates to a mobile communication terminal, and more particularly, to a method for searching a menu in a mobile communication terminal.

2. Background of the Related Art

In recent years, along with the rapid progress in information communication technology, the information and communication environment is being dramatically changed. In particular, the number of mobile communication users is rapidly increasing. Accordingly, the demand for personal portable communication apparatuses, e.g., mobile communication terminals, is increasing at an explosive rate.

The mobile communication terminal provides a variety of text/character services. For example, a user can send/receive messages, store data, receive weather forecasts and securities market information. The terminal can also be used for telephone calls, and recently provides internet services using mobile communication.

FIG. 1 is a schematic diagram of an external structure of a related art mobile communication terminal. As illustrated in FIG. 1, the related art mobile communication terminal (hereinafter "terminal") includes a terminal main body 101, a liquid crystal display (LCD) 102, and a key input unit 103. In addition, the key input unit 103 can include various function keys, for example, a numeric key, call key, end/power key, search key, store key, delete key, and menu key.

FIG. 2 is a schematic diagram of an internal structure of a mobile communication terminal as illustrated in FIG. 1. Referring to FIG. 2, the key input unit 103 is used as a user data input device. It typically includes at least 22 key buttons. The mobile station modem (MSM) 104 has a microprocessor unit (MPU) for controlling all devices, and stores an event signal inputted through the key input unit 103 in a flash memory 105 or converts data read out from the flash memory 105 into a CD signal to output the same to a LCD 102.

The flash memory 105 stores initial data to be displayed on the LCD 102, and a cache memory 106 reads the stored data in the flash memory 105 and edits final data to be outputted to the LCD 102. The LCD 102 receives the data stored in the cache memory 106 through the MSM 104, and displays the same so that a user can recognize it.

A method for searching a menu in the thusly constructed related art mobile communication terminal will next be described.

When a user presses the menu key in the key input unit 103, the LCD 102 displays a main menu, such as "volume control," "telephone bell selection," "talk time," and the like, as illustrated in FIG. 3A. In this state, when the user selects, for example, the "telephone bell selection" menu, the LCD 102 displays sub-menus, such as "telephone bell type," "basic melody," "OTA melody," as illustrated in FIG. 3B. Subsequently, if the user selects the "telephone bell type" menu from the sub-menus, items such as the "telephone bell," "vibration," "vibration+telephone bell," and the like are sequentially searched, as illustrated in FIG. 3C.

A desired function can thus be selected.

Meanwhile, if the user knows the number corresponding to each menu item, he or she can search a desired menu item. However, there is typically a limit in the user's ability to memorize the numbers of menu items.

In addition, if the user realizes that the desired item is not included in the selected main menu while sequentially searching the main menus and the sub menus, the user must press the "end" key, and thereafter release the search step in the order of a lowest level sub menu, an upper level sub menu, and finally the main menu, and try to access the desired item again. Alternatively, the user can perform the search step from the beginning by pressing the "end" key to release the menu search, and then pressing the menu key again.

The related art mobile terminal, however, has various problems. For example, since the searching method has a hierarchical menu tree structure, it is necessary to pass through an upper menu in order to move from a first lower level menu to another lower level menu of another category. Accordingly, when accessing a single item contained in a specific menu using the related art menu searching method, the user must navigate hierarchically configured menus, one by one.

In addition, if a menu is selected in error, the user must again perform the search step in the reverse order, or must start searching from the beginning after releasing the corresponding menu selection, in order to locate a desired menu.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a mobile communication terminal and or method for searching a menu in a mobile communication terminal that substantially obviates problems caused by disadvantages in the related art.

It is another object of the present invention to provide mobile communication terminal and a method for searching a menu in a mobile communication terminal in which a main menu and a sub-menu can be simultaneously searched on a single menu screen.

It is another object of the present invention to provide a mobile communication terminal and a method for searching a menu in a mobile communication terminal that uses a two-dimensional menu navigation format.

It is another object of the present invention to provide a mobile communication terminal and a method for searching a menu in a mobile communication terminal in which horizontal menu movement is possible on a single menu screen.

It is still another object of the present invention to provide a mobile communication terminal and a method for searching a menu in a mobile communication terminal in which the number of menu accessing steps can be reduced by configuring all menu items in a planar structure.

To achieve at least the above objects in whole or in parts, there is provided a method for searching a menu in a mobile communication terminal, wherein a plurality of main menus and sub-menus of each main menu are simultaneously searched on a single menu screen by using up and down shift keys and left and right shift keys.

To further achieve at least the above objects, in whole or in parts, there is provided a method for searching a menu in a mobile communication terminal including the steps of displaying a menu screen by inputting a menu key; displaying a plurality of sub-menus on the same menu screen by selecting one of a plurality of main menus displayed on the menu screen; and selecting one of the plurality of sub-menus for thereby displaying a detailed list of the sub menu on a special window.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
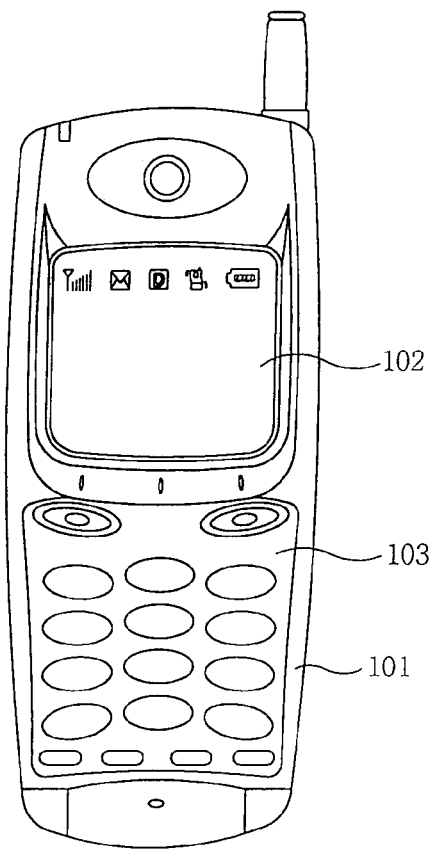
FIG. 1 is a schematic diagram illustrating an external structure of a related art mobile communication terminal.
Figure 2:
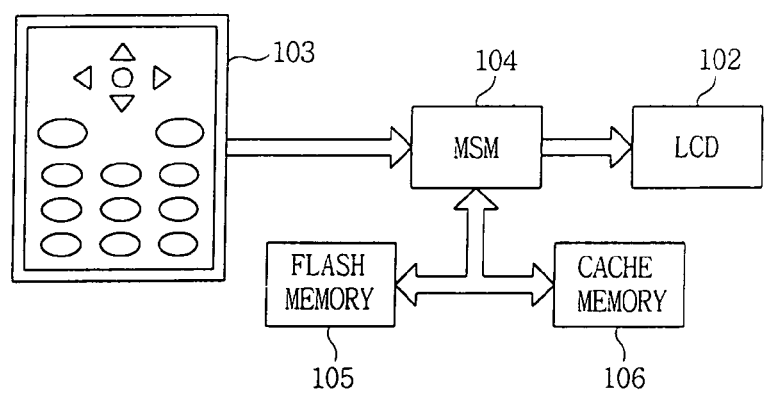
FIG. 2 is a schematic diagram illustrating an internal structure of a related art mobile communication terminal.
Figure 3A:
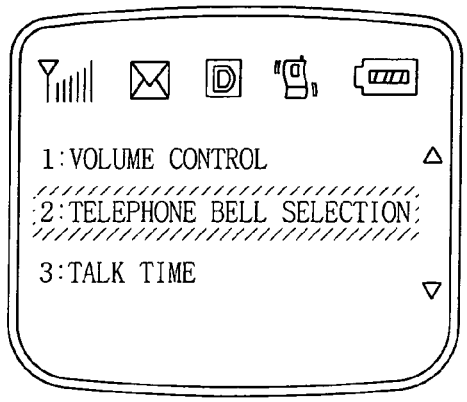
FIGS. 3A, 3B, and through 3C are drawings illustrating a related art method for searching a menu in a mobile communication terminal.
Figure 3B:
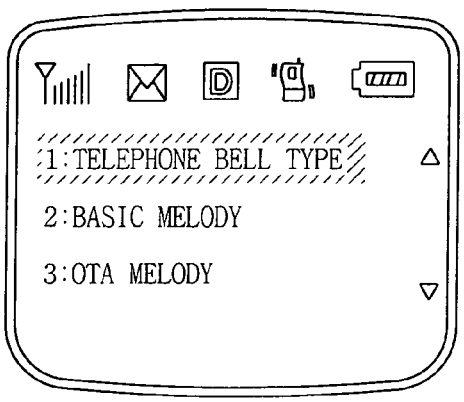
Figure 3C:
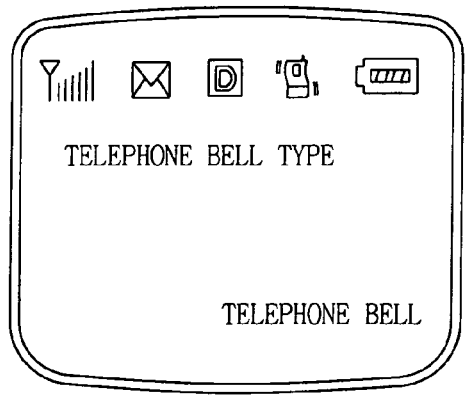
Figure 4:
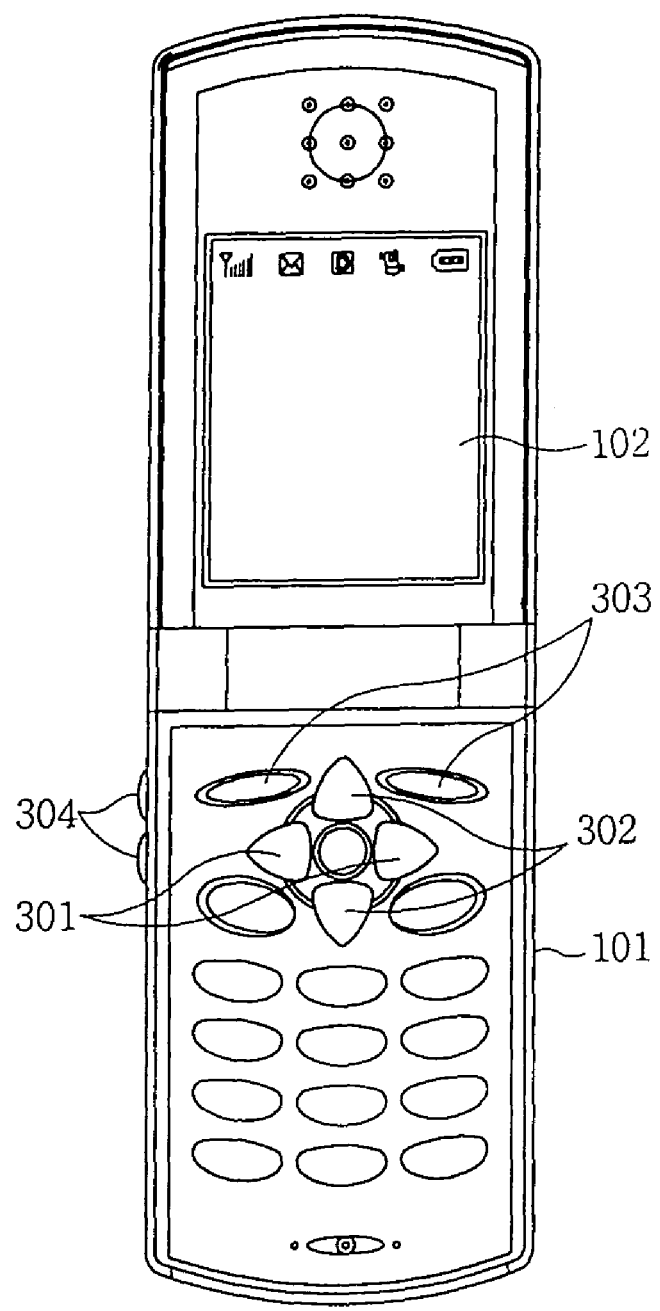
FIG. 4 is a schematic diagram illustrating the structure of a mobile communication terminal according to a preferred embodiment of the present invention.

FIG. 4 is a schematic diagram illustrating the structure of a mobile communication terminal according to the preferred embodiment of the present invention. Referring to FIG. 4, the mobile communication terminal preferably includes left and right shift keys 301 and up and down shift keys 302. Additionally, it preferably includes the keys described with reference to the related art mobile communication terminal, as shown in FIG. 1. In addition, the present invention preferably includes 20 available function keys, including two soft keys 303 and two side keys 304.

The left and right shift keys 301 are preferably used for movement between main menus, and the up and down shift keys 302 preferably used key for movement between sub menus and for selection of a detailed list. In addition, the left shift key can be used for deleting characters during an editing step.

The left soft key of the two soft keys 303 is preferably used to perform operations such as menu selection, Korean-English conversion, input, edit, cancel, and the like. It is also used for changing a flag (selecting a function) and increasing or decreasing a variable value on a program. The right soft key is used for performing operations such as menu check, store, complete, send, and the like. It is also used for changing a state and a sub state, or for returning to the previous state of a program. Finally, the side keys 304 are preferably used for controlling movement between sub menus (in a menu state), or controlling a key tone volume or a speech volume, according to the state of the terminal.

A method for searching a menu in the thusly constructed mobile communication terminal according to the preferred embodiment of the present invention will now be described with reference to the accompanying drawings.

The present invention is preferably configured in a two-dimensional menu navigation format. This makes it easier to understand the correlation of the sub-menu with an upper level menu. In other words, the present invention simultaneously displays a plurality of main menus, and sub-menus of each main menu, on a single menu screen.

In addition, the preferred embodiment is configured in such a manner that all menu items (sub menus and detailed lists thereof) contained in the conventional vertical menu tree structure are distributed in a planar structure in order to reduce the number of menu accessing steps.

In other words, when a user presses a menu key of a plurality of keys, a plurality of main menu icons are displayed on the menu screen of a LCD 102. In this state, the user selects a desired main menu by operating the left and right shift keys 301, and confirms the selection of the corresponding main menu by using the right soft key 303, upon such conformation, sub menus of the selected main menu are two-dimensionally displayed on the LCD 102.

Figure 5A:
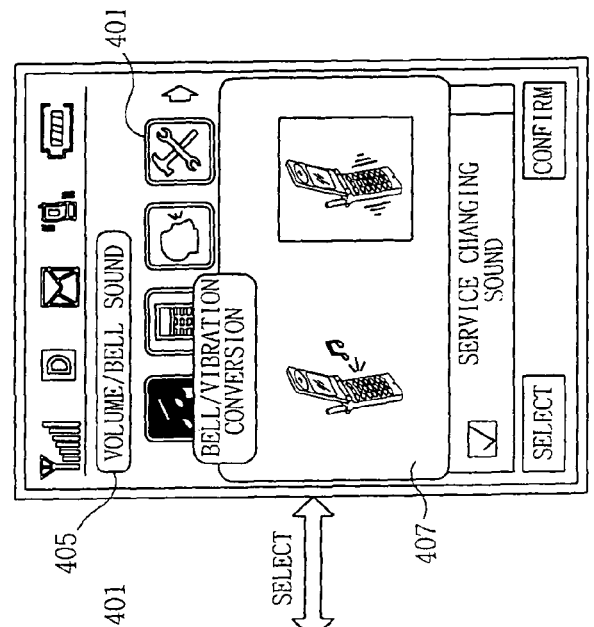
FIGS. 5 and 6 are views illustrating a method for searching a menu in a mobile communication terminal according to the preferred embodiment of the present invention.

At this time, at least three main and sub menu items are displayed on the menu screen. That is, as illustrated in FIG. 5A, the plurality of main menu icons 401 are displayed in a horizontal direction of the menu screen, and a plurality of sub menus 406 corresponding to each main menu are displayed in a vertical direction of the menu screen.

In addition, the plurality of sub menus 406 are displayed on a specially set sub menu list window 402. The thusly displayed sub menus 406 are divided into application type icons 403 for displaying a detailed list on a new window and list type icons 404 for only indicating "set/release".

For instance, when the user selects the main menu icon 401 corresponding to "volume/bell sound" in the main menus displayed on the menu screen, the sub menu list window 402 displays sub menus, such as "bell/vibration conversion," "bell/melody conversion," "bell loudness," "call connecting sound," "service changing sound," for example. The selected main menu icon is then displayed in such a way as to indicate selection, for example by being shaded. In the preferred embodiment, the name of the selected main menu is also displayed at the upper end of the main menu icon.

In this state, if the user moves to other main menus by operating the left and right shift keys 301, sub menus of the moved menu screen are displayed on the sub menu list window 402.

Once the sub menus are displayed on the sub menu list window 402, the user can select one of the plurality of sub menus by operating the up and down shift keys 302. If the user selects one of the application type icons, for example, "bell/vibration conversion," "bell/melody conversion," and "bell loudness," the detailed list of the selected sub menu is displayed on a new window. That is, in the preferred embodiment, the state of the menu is distinguished from the state of the list by opening a new window for the selected item.

Figure 5B:
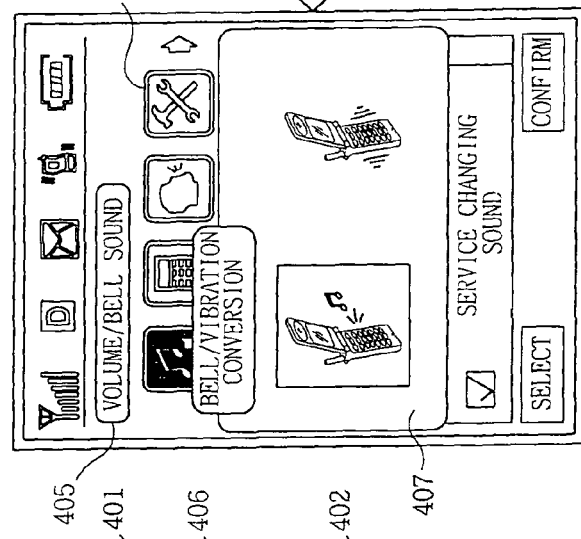
Figure 5C:
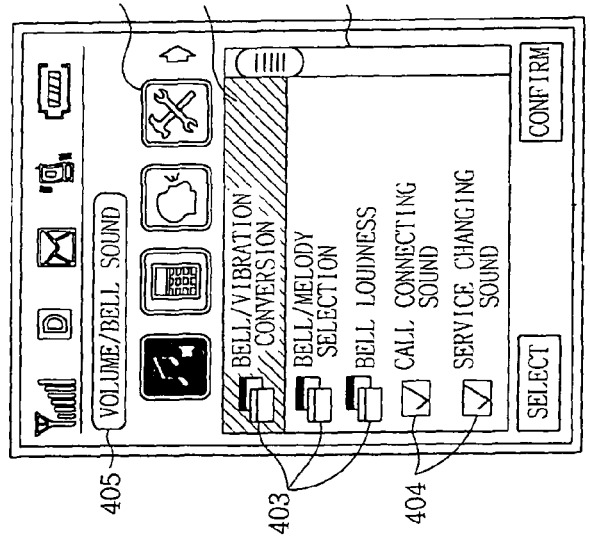

For instance, if the "bell/vibration conversion" is selected from the sub menus, the LCD 102 displays a new window 407. The new said window 407 preferably displays a detailed list, including the options to set the "bell" or "vibration" mode. Thus, the user selects a desired function, e.g., bell/vibration conversion, by selecting/confirming one item from the list displayed on the window 407 using the left and right soft keys 303, as illustrated in FIGS. 5B and 5C.

Since the sub menus, such as the "call connecting sound" and "service changing sound," are displayed as list type icons capable of only selecting "set/release", the user can select/confirm or release the corresponding sub menu on the sub menu list using the left and right soft keys 303.

Figure 6C:
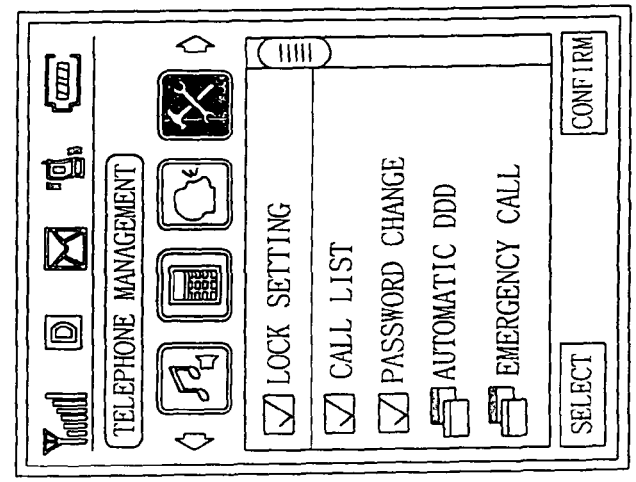
Figure 6B:
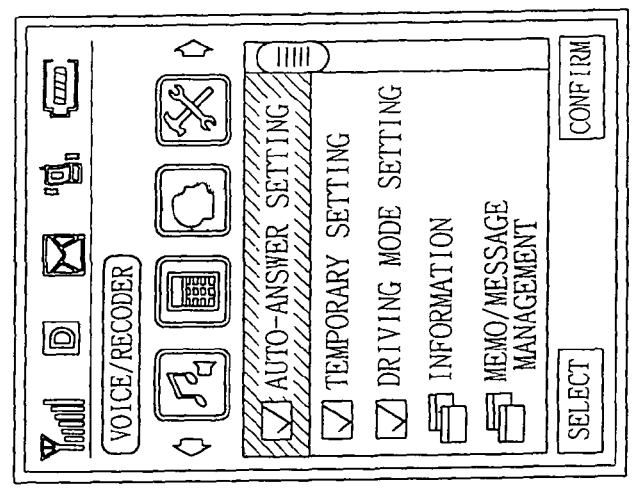
Figure 6A:
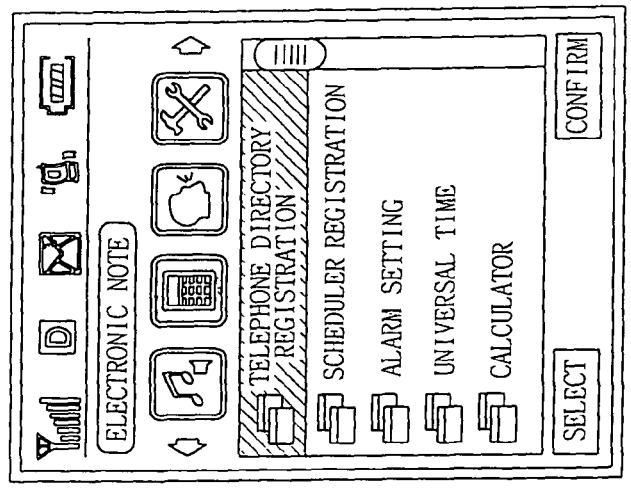

As illustrated in FIG. 6A, if the user moves to another main menu (for example, "electronic note") using the left and right shift keys 301, the icon of the "electronic note" is shaded and the name of the selected main menu is displayed on the upper end of the main menu icon, as described above. In other words, in the preferred embodiment, it is possible to search other main menus while searching a sub menu or a detailed list thereof.

As illustrated in FIG. 6A, the sub menu list window 402 displays a detailed list of items, such as "telephone directory registration," "scheduler registration," "alarm setting," "universal time," "calculator," and the like. Additionally, the user can select a desired sub menu on the displayed detailed list by operating the up and down shift keys. Hence, the detailed list for the selected sub menu is displayed on a new window.

By using the same method, as illustrated in FIGS. 6B and 6C, the user can search any other main menu, such as "voice recorder," "telephone management" and the like. In addition, the preferred embodiment configures the searching step of sub menus subject to each main menu in the same manner, so that the user is not confused when searching/selecting a menu.

Main menus are preferably arranged in a horizontal direction of the menu screen, and sub menus are preferably arranged in a vertical direction of the screen, for convenience of explanation. However, any configuration could be used. For example, the main menus could be arranged in the vertical direction of the menu screen, and the sub menus could be arranged in the horizontal direction of the menu screen.

The present invention has many advantages. For example, in the preferred embodiment, it is possible to configure a very simple menu searching step by configuring a two-dimensional menu navigation format, without having to use a hierarchical menu tree structure.

In addition, it is easier to search a desired menu since the correlation with an upper level menu can be easily understood on a single screen. Hence, more than just a list of the menu that the user searches for can be viewed.

Moreover, it is possible to reduce the inconvenience caused by movement in the searching step by making a configuration in such a manner that a horizontal menu movement is made possible. That is, it is not necessary to pass through an upper level menu upon moving from a lower level menu to another lower level menu of other categories (main menu).

In addition, the number of menu accessing steps is reduced by widely distributing all menu items in a planar structure allowing the user to directly select a desired menu item. This makes it easier and quicker to access the desired item.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of displaying in a mobile communication terminal having a display screen that includes a main menu region and a sub menu region, the method comprising:
    displaying main menu items in a first direction on the main menu region of the display screen;
    displaying sub menu items corresponding to a selected main menu item on the sub menu region, the sub menu items being displayed in a second direction of the display screen while the main menu items are being displayed;
    selecting one of the displayed sub menu items; and
    in response to selecting one of the sub menu items, displaying a new window on the display screen containing information of the selected sub menu item so that at least a portion of the main menu items and a portion of sub menu items are simultaneously displayed on the display screen while the new window is displayed,
    wherein the sub menu region is provided in a shape of a window that displays an application type icon or a list type icon, wherein the window of the sub menu region distinguishes the sub menu region of the display screen from the main menu region of the display screen,
    wherein the sub menu region includes at least one of the sub menu items and a scroll bar that is displayed according to a number of the sub menu items, and
    wherein the scroll bar is displayed in the window of the sub menu region when the sub menu items are not entirely displayed on the sub menu region.

2. The method of claim 1, wherein the sub menu region is provided in the shape of the window that displays both the application type icon and the list type icon.

3. A method of displaying in a mobile communication terminal having a display screen that includes a main menu region and a sub menu region, the method comprising:
    displaying first menu items in a first direction on the main menu region of the display screen;
    displaying second menu items corresponding to a selected one of the first menu items, the second menu items being displayed in a second direction of the sub menu region of the display screen while the first menu items are being displayed;
    selecting one of the displayed second menu items; and
    in response to selecting one of the second menu items, displaying a new window on the display screen containing information of the selected second menu item, wherein the new window partially overlaps the second menu items displayed on the display screen, and wherein a portion of the first menu items and a portion of the second menu items are displayed on the display screen when the new window partially overlaps the second menu items,
    wherein the sub menu region is provided in a shape of a window that displays an application type icon or a list type icon, the window of the sub menu region distinguishes the sub menu region of the display screen from the main menu region of the display screen,
    wherein the sub menu region includes at least one of the second menu items and a scroll bar that is displayed according to a number of the second menu items, and
    wherein the scroll bar is displayed in the window of the sub menu region when the second menu items are not entirely displayed on the sub menu region.

4. The method of claim 3, wherein the first menu items correspond to a first menu and the second menu items correspond to a second menu.

5. The method of claim 4, wherein the first menu and the second menu are arranged hierarchically, and the first menu is hierarchically higher than the second menu.

6. The method of claim 3, wherein displaying the new window includes displaying a detailed list in the new window corresponding to the selected second menu item.

7. The method of claim 6, wherein the detailed list includes a plurality of desired functions.

8. The method of claim 5, wherein the detailed list includes a plurality of options.

9. The method of claim 6, wherein the detailed list relates to controlling a feature corresponding to the selected second menu item.

10. The method of claim 3, wherein selecting the one of the displayed second menus items includes selecting the one of the displayed second menu items using a key of the mobile communication terminal.

11. The method of claim 10, wherein the key comprises one of a plurality of navigation keys.

12. The method of claim 10, wherein the key comprises a side key located on a side of the mobile communication terminal other than a side having the display screen.

13. The method of claim 3, wherein the first menu items comprise icons.

14. The method of claim 3, wherein the second menu items comprise icons.

15. The method of claim 3, wherein the first direction comprises a horizontal direction and the second direction comprises a vertical direction.

16. The method of claim 3, further comprising displaying an indicator in the main menu region near the displayed first menu items to identify existence of non-displayed first menu items.

17. The method of claim 16, wherein the indicator comprises an arrow.

18. The method of claim 3, further comprising selecting one of the first menu items.

19. The method of claim 18, further comprising displaying a name of the selected first menu item.

20. The method of claim 19, wherein the name is displayed at an upper portion of the display screen.

21. The method of claim 20, wherein the second menu items are displayed on a second menu window positioned in a bottom portion of the display screen.

22. The method of claim 21, wherein the name of the selected second menu window is displayed at a prescribed portion of an upper portion of the second menu window.

23. The method of claim 18, wherein the first menu items are displayed as icons, and selecting the one of the first menu items includes displaying the selected one of the first menu items as an icon with a shaded background.

24. The method of claim 18, further comprising displaying the selected first menu item in a shaded manner to represent that the first menu item has been selected.

25. The method of claim 3, where displaying the second menu items includes displaying a check box besides at least one of the second menu items.

26. The method of claim 3, wherein displaying the second menu items includes displaying at least one of the items as an application type icon or as a list type icon.

27. The method of claim 3, further comprising displaying information regarding a set feature of the mobile communication terminal.

28. The method of claim 3, further comprising highlighting one of the displayed second menu items.

29. The method of claim 28, wherein highlighting one of the displayed second menu items includes highlighting an area around the displayed second menu item.

30. The method of claim 3, further comprising providing movement between the first menu items by using left and right keys or up and down keys provided in the mobile communication terminal.

31. The method of claim 30, wherein when the first menu items are changed, the second menu items of the newly selected first menu item are simultaneously displayed.

32. The method of claim 3, wherein the first menu items are continuously displayed regardless of the selection of the second menu items.

33. The method of claim 3, wherein the sub menu region is provided in the shape of the window that displays both the application type icon and the list type icon.

34. A method of displaying in a mobile communication terminal having a display screen that includes a main menu region and a sub menu region, the method comprising:

displaying first menu items on the main menu region of the display screen such that a first one of the first menu items is adjacent to a second one of the first menu items in a first direction;

displaying second menu items corresponding to the first one of the first menu items, the second menu items being displayed in a second direction on the sub menu region of the display screen while information corresponding to the first one of the first menu items is being displayed in the main menu region of the display screen;

selecting one of the displayed second menu items; and in response to selecting one of the second menu items, displaying a new window on the display screen containing information of the selected second menu item while also displaying at least a portion of the first menu items and a portion of second menu items on the display screen, wherein the sub menu region is provided in a shape of a window that displays an application type icon or a list type icon, wherein the window of the sub menu region distinguishes the sub menu region of the display screen from the main menu region of the display screen, wherein the sub menu region includes at least one of the second menu items and a scroll bar that is displayed according to a number of the second menu items, and wherein the scroll bar is displayed in the window of the sub menu region when the second menu items are not entirely displayed on the sub menu region.

35. The method of claim 34, further comprising:

selecting a key to display information in the main menu region of the display screen, the displayed information corresponding to a second one of the first menu items; and displaying second menu items corresponding to the second one of the first menu items while the information corresponding to the second one of the first menu items is being displayed in the main menu region of the display screen.

36. The method of claim 35, wherein selecting the one displayed second menu item comprises selecting one of the displayed second menu items corresponding to the second one of the first menu items.

37. The method of claim 34, wherein displaying the new window includes displaying a detailed list in the new window corresponding to the selected second menu item.

38. The method of claim 37, wherein the detailed list includes a plurality of desired functions.

39. The method of claim 37, wherein the detailed list includes a plurality of options.

40. The method of claim 37, wherein the detailed list relates to controlling a feature corresponding to the selected second menu item.

41. The method of claim 34, wherein the new window partially overlaps the second menu items displayed on the sub menu region of the display screen while also displaying the portion of the second menu items.

42. The method of claim 34, wherein selecting the one of the displayed second menu items includes selecting the one of the displayed second menu items using a key of the mobile communication terminal.

43. The method of claim 42, wherein the key comprises one of a plurality of navigation keys.

44. The method of claim 42, wherein the key comprises a side key located on a side of the mobile communication terminal other than a side having the display screen.

45. The method of claim 34, wherein the first menu items comprise icons.

46. The method of claim 34, wherein the second menu items comprise icons.

47. The method of claim 34, further comprising displaying an indicator in the main menu region near the displayed first menu items to identify existence of non-displayed first menu items.

48. The method of claim 47, wherein the indicator comprises an arrow.

49. The method of claim 34, further comprising selecting one of the displayed first menu items.

50. The method of claim 49, further comprising displaying a name of the selected first menu item.

51. The method of claim 50, wherein the name is displayed at an upper portion of the display screen.

52. The method of claim 50, wherein the second menu items are displayed on a second menu window positioned in a bottom portion of the display screen.

53. The method of claim 49, further comprising displaying the selected first menu item in a shaded manner to represent that the first menu item has been selected.

54. The method of claim 34, further comprising displaying information regarding a set feature of the mobile communication terminal.

55. The method of claim 34, further comprising highlighting one of the displayed second menu items.

56. The method of claim 55, wherein highlighting one of the displayed second menu items includes highlighting an area around the displayed second menu item.

57. The method of claim 34, wherein the sub menu region is provided in the shape of the window that displays both the application type icon and the list type icon.

58. A method comprising:
displaying at least one item from a first menu simultaneously with displaying a second menu on a display screen of a mobile communication terminal, the second menu including a plurality of items listed vertically, the display screen including a main menu region and a sub menu region, wherein the at least one item of the first menu is displayed in the main menu region and the plurality of items of the second menu are displayed in the sub menu region, wherein the sub menu region is distinguished on the display screen from the main menu region;
selecting one item from the displayed second menu; and
in response to selecting one item from the second menu, displaying a detailed list corresponding to the selected second menu item in a new window of the display screen, wherein the new window partially overlaps the second menu items displayed on the display screen, and wherein a portion of the first menu items and a portion of the second menu items are displayed on the display screen when the new window partially overlaps the second menu items,
wherein the sub menu region is provided in a shape of a window that displays an application type icon or a list type icon, wherein the window of the sub menu region distinguishes the sub menu region of the display screen from the main menu region of the display screen,
wherein the sub menu region includes at least one of the second menu items and a scroll bar that is displayed according to a number of the second menu items, and
wherein the scroll bar is displayed in the window of the sub menu region when the second menu items are not entirely displayed on the sub menu region.

59. The method of claim 58, wherein the first menu and the second menu are in a hierarchical structure, and the first menu is higher in the hierarchical structure than the second menu.

60. The method of claim 58, wherein the detailed list relates to a plurality of desired functions.

61. The method of claim 58, wherein selecting one item from the displayed second menu includes selecting the one item using a key of the mobile communication terminal.

62. The method of claim 61, wherein the key comprises a side key located on a side of the mobile communication terminal other than a side having the display screen.

63. The method of claim 58, wherein the first menu comprises a plurality of icons.

64. The method of claim 58, wherein the second menu comprises a plurality of icons.

65. The method of claim 58, further comprising displaying an indicator in the main menu region near the displayed first menu to identify existence of non-displayed first menu items.

66. The method of claim 58, further comprising displaying a name of the at least one item from the first menu.

67. The method of claim 58, further comprising displaying the at least one item from the first menu in a shaded manner to represent that the at least one item has been selected.

68. The method of claim 58, further comprising highlighting one item of the displayed detailed list.

69. The method of claim 68, wherein highlighting the one item of the displayed detailed list includes highlighting an area around the one item of the displayed detailed list.

70. The method of claim 58, wherein the sub menu region is provided in the shape of the window that displays both the application type icon and the list type icon.

71. A mobile communication terminal, comprising:
a display screen that includes a main menu region and a sub menu region, wherein the sub menu region is distinguished on the display screen from the main menu region; and
a plurality of keys, wherein the display screen to display first menu items in a first direction on the main menu region of the display screen and to display second menu items in a second direction on the sub menu region of the display screen while the first menu items are being displayed, the second menu items corresponding to a selected one of the first menu items, wherein in response to a user selecting one of the displayed second menu items using one of the keys, the display screen to display a new window on the display screen containing information of the selected second menu item, wherein the new window partially overlaps the second menu items displayed on the display screen, and wherein a portion of the first menu items and a portion of the second menu items are displayed on the display screen when the new window partially overlaps the second menu items,
wherein the sub menu region is provided in a shape of a window that displays an application type icon or a list type icon, wherein the window of the sub menu region distinguishes the sub menu region of the display screen from the main menu region of the display screen,
wherein the sub menu region includes at least one of the second menu items and a scroll bar that is displayed according to a number of the second menu items, and
wherein the scroll bar is displayed in the window of the sub menu region when the second menu items are not entirely displayed on the sub menu region.

72. The terminal of claim 71, wherein the first menu items correspond to a first menu and the second menu items correspond to a second menu.

73. The terminal of claim 71, wherein the display screen displays the new window that includes a detailed list corresponding to the selected second menu item.

74. The terminal of claim 73, wherein the detailed list relates to a plurality of desired functions.

75. The terminal of claim 71, wherein the one key comprises a side key located on a side of the mobile communication terminal other than a side having the display screen.

76. The terminal of claim 71, wherein the display screen displays an indicator in the main menu region near the displayed first menu items to identify existence of non-displayed first menu items.

77. The terminal of claim 71, wherein the display screen displays a name of the selected first menu item.

78. The terminal of claim 77, wherein the display screen displays the name at an upper portion of the display screen.

79. The terminal of claim 71, wherein the display screen displays the selected first menu item in a shaded manner to represent that the first menu item has been selected.

80. The terminal of claim 71, wherein the display screen displays a check box besides at least one of the second menu items.

81. The terminal of claim 71, wherein the display screen highlights one of the displayed second menu items.

82. The terminal of claim 81, wherein the display screen highlights one of the displayed second menu items by highlighting an area around the displayed second menu item.

83. The terminal of claim 71, wherein the sub menu region is provided in the shape of the window that displays both the application type icon and the list type icon.

* * * * *